Patented Mar. 17, 1931

1,796,825

UNITED STATES PATENT OFFICE

HOWARD BEATTY, OF HINSDALE, AND CHARLES MONGERE, OF CHICAGO, ILLINOIS, ASSIGNORS TO THE GLIDDEN FOOD PRODUCTS CO., OF CHICAGO, ILLINOIS, A CORPORATION OF ILLINOIS

FORMULA AND PROCESS FOR MANUFACTURING PEANUT-FLAVORED COATING FOR ICE CREAM AND HARD PEANUT-FLAVORED COATING

No Drawing.   Application filed June 2, 1928.  Serial No. 282,504.

The present invention relates to a peanut flavored coating for confections, cakes, and other edibles, including ice cream, and may be varied to be used as a confection itself.

The principal object is to provide a coating or icing with a peanut base, for use on cakes and the like, which may be substituted for chocolate and similar coatings now in use.

Another object is to remove or utilize the natural oil of the nut itself to either form a hard brittle coating or a soft sustaining coating. The hard brittle coating can be obtained by the removal of the natural nut oil, the soft coating being obtained by leaving the natural oil in the coating.

The hard brittle coating will be used mostly in connection with the coating of cakes and pastries, whereas the soft coating will be used probably in connection with confections and ice cream.

Other objects will be disclosed in the specification and claims.

It is well known that by roasting the peanuts, the flavor is decidedly enhanced. For this reason, we prefer to first roast the peanuts before proceeding with the other steps.

After roasting, we remove from the peanuts most of the peanut oil, either by pressure or extraction. We then mix the resulting cake or meal with dry milk and sugar.

A hard neutral fat, such as cocoanut oil, stearine, palm kernel oil, or other fats having the general character of cocoa butter, in a liquid state is next added to the above mixture sufficiently to form a rather stiff paste. In order to thoroughly incorporate the different ingredients, the paste is run through milling machinery, such as chocolate finishing rolls, to obtain a resultant admixture of a finer mesh. Additional hard neutral fat in a liquid form should then be added as a thinner to bring about the desired consistency of flow so that it is suitable for either hand or machine dipping.

In connection with coating or icing cakes and pastries, it is desirable at this stage that the amount of fat in the coating should reach between thirty and forty-five percent of the total composition.

A coating of this kind is handled similar to chocolate coating and its physical properties resemble chocolate in that it contains a neutral fat in sufficient quantity to mix thoroughly with the dry materials in the coating, and when melted cause the mixture to flow to about the consistency of chocolate at equal temperatures.

It is desirable that the neutral fat should have a melting point of about that of blood temperature and a congealing point somewhat lower. In order to get the consistency hard and brittle when it congeals, it is necessary to remove most of the peanut oil from the roasted peanuts, as the oil would have too much of a softening effect on the hard fat which would result in a soft or sticky coating.

The defatted peanut fiber would form ten to forty percent of the finished composition, depending upon the strength of the flavor desired; the amount of sugar and dried milk can be proportioned to suit the use to which the composition is to be put, and the individual's taste.

If desirable, it is possible to mold the composition into cakes, similar to the conventional hard chocolate, to be sold for coating and icing purposes, or to be eaten in a solid form as a confection. Where the peanut flavored material is to be used for coating ice cream, or for candy, the roasted peanuts are crushed in the form of peanut butter, and mixed with sugar and dry milk, the natural amount of peanut oil being left in the mixture. A neutral fat, such as cocoanut oil, having a melting point of from seventy-six to ninety degrees is then added in sufficient quantity to make a stiff paste which is then run through the milling machinery similar to chocolate finishing rolls in order to bring the mixture to a fine mesh and thoroughly mix the various ingredients. After milling, additional cocoanut oil, palm kernel oil, or their stearines, may be added in order to sufficiently thin the mixture to permit same to flow. The peanut flavored coating at this step contains a total of from thirty-five to fifty percent of oil and fat, part of which is the natural peanut oil, the other part cocoanut oil or stearine. There is approximately fifteen percent of peanut fiber present with the remainder made up of sugar and dry milk, the dry milk to be manufactured either from whole or skim milk.

Ice cream when dipped in a coating of this kind quickly congeals and a protective covering is formed thereby for the said ice cream, and the presence of the peanut oil is an advantage in that it serves to break the hard brittle nature of cocoanut oil and makes it more easily melted at the temperature of the mouth. Where desired, the brittle coating may be used to provide a form sustaining wall.

We do not wish to be confined to the use of peanuts in either the coatings or the icing, but we may substitute nut meats, other than peanuts, such as filberts, walnuts, and others. Where the coating is to be used on a frozen, chilled, or cold product, we allow the natural oil to remain and may add cocoanut oil, palm kernel oil or thin stearines as a thinner for the peanut or other nut mass in addition to the natural peanut oil present in the peanut or other nut butter of the coating, or besides or in lieu of the oils mentioned, additional peanut oil may be added as a thinner to produce a satisfactory coating for ice cream, ice cream bars or other frozen products, but under other conditions, the natural oil should be removed. For example, where it is to be used simply as an icing, although it may be used as a form sustaining coating, it is desirable to remove the natural oil, which as stated, has a softening effect on the neutral fat used. Neutral fats, such as cocoanut oil, palm kernel oil, and the like, may be used.

The use of dry milk is not necessary in order to accomplish the results specified, but it is placed in the composition to lend richness thereto. The use of sugar is to sweeten the mixture and make it more palatable.

Having described our invention, what we claim as new and novel is:

1. As an article of manufacture, a coating for cakes and pastries comprising comminuted nut meat, flavoring elements, and a normally hard edible neutral fat, said ingredients being proportioned to provide an ultimate normally hard product but meltable for application to cakes and the like and adapted to there congeal into a brittle coating.

2. As an article of manufacture, a coating for cakes and pastries comprising oil extracted comminuted peanuts, flavoring elements, and a normally hard edible neutral fat in sufficient proportion to provide an ultimate normally hard product meltable for application to cakes and the like and adapted to there congeal into a brittle coating at normal temperature.

3. As an article of manufacture, a coating for cakes and pastries comprising nut fibre, flavoring elements, and an edible stearine in sufficient quantity to provide an ultimate normally hard product meltable for application to cakes and the like and adapted to there congeal into a brittle coating at room temperature.

4. As an article of manufacture, a coating for cakes and pastries comprising nut fibre, flavoring elements, and edible vegetable fat solid at room temperature in sufficient quantity to provide an ultimate normally hard product meltable for application to cakes and the like and adapted to there congeal into a brittle coating at room temperature.

5. As an article of manufacture, a coating for cakes and pastries comprising nut fibre, flavoring elements, and palm kernel stearine in sufficient quantity to provide an ultimate normally hard product meltable for application to cakes and the like and adapted to there congeal into a brittle coating at room temperature.

6. As an article of manufacture, a coating for cakes and pastries comprising nut fibre, flavoring elements, and cocoanut stearine in sufficient quantity to provide an ultimate normally hard product meltable for application to cakes and the like and adapted to there congeal into a brittle coating at room temperature.

7. As an article of manufacture, a coating for cakes and pastries comprising nut fibre, flavoring elements, and an edible normally hard neutral fat forming approximately 30 to 45% of the total composition of the ultimate product.

8. The process of making a coating for cakes and pastries which comprises mixing with comminuted nut meat and flavoring elements, an edible fatty material of a constituency and proportion to provide an ultimate normally hard product meltable for application to cakes and the like and adapted to there harden into a brittle coating at normal temperature.

9. The process of making a coating for cakes and pastries which comprises mixing with nut fibre and flavoring elements, an edible fatty material of a consistency and proportion to form a stiff paste and milling the same, and then adding an additional amount of edible fatty material to provide an ultimate normally hard product meltable for application to cakes and the like and adapted to there harden into a brittle coating at normal temperature.

10. The process of making a coating for cakes and pastries which comprises mixing with nut fibre and flavoring elements, an edible fatty material of a consistency and proportion to form a stiff paste and milling the same, and then adding an additional amount of edible fatty material to provide an ultimate normally hard product meltable for application to cakes and the like and adapted to there harden into a brittle coating at normal temperature, one or both fatty additions being in liquid form.

11. The process of making a coating for cakes and pastries which comprises mixing with nut fibre and flavoring elements, an edible normally hard neutral fat forming approximately 30 to 45% of the total composition of the ultimate product.

12. The process of making a coating for cakes and pastries which comprises mixing with comminuted nut meat and flavoring elements, an edible stearine of a constituency and proportion to provide an ultimate normally hard product meltable for application to cakes and the like and adapted to there harden into a brittle coating at normal temperature.

13. The process of making a coating for cakes and pastries which comprises taking roasted peanuts, removing most of the oil to provide a nut fibre, mixing dry milk and sugar to give desired flavor, incorporating an edible stearine to form a stiff paste, and incorporating an added amount of stearine sufficient to provide an ultimate product meltable for dipping of the cakes but adapted to harden thereon as a brittle coating at normal temperature.

In testimony whereof we affix our signatures.

HOWARD BEATTY.
CHARLES MONGERE.